(12) United States Patent
Huang (10) Patent No.: US 10,694,891 B2
(45) Date of Patent: Jun. 30, 2020

(54) PRESSURE OVEN

(71) Applicant: Zhongshan Jinguang Household Appliance Manufacture Co., Ltd., Zhongshan, Guandong (CN)

(72) Inventor: Houjun Huang, Guangdong (CN)

(*) Notice: Subject to any disclaimer, the term of this patent is extended or adjusted under 35 U.S.C. 154(b) by 316 days.

(21) Appl. No.: 15/743,252

(22) PCT Filed: Dec. 3, 2016

(86) PCT No.: PCT/CN2016/108462
§ 371 (c)(1),
(2) Date: Jan. 9, 2018

(87) PCT Pub. No.: WO2017/181687
PCT Pub. Date: Oct. 26, 2017

(65) Prior Publication Data
US 2018/0199756 A1 Jul. 19, 2018

(30) Foreign Application Priority Data

Apr. 22, 2016 (CN) .......................... 2016 1 0253096

(51) Int. Cl.
*A47J 27/08* (2006.01)
*A47J 37/06* (2006.01)
*A47J 27/092* (2006.01)

(52) U.S. Cl.
CPC ....... *A47J 37/0629* (2013.01); *A47J 27/0804* (2013.01); *A47J 27/092* (2013.01)

(58) Field of Classification Search
CPC ... A47J 37/0629; A47J 27/0804; A47J 27/092
(Continued)

(56) References Cited

U.S. PATENT DOCUMENTS 8,327,756 B1  12/2012 Hoffman et al.

FOREIGN PATENT DOCUMENTS

CN  103211519 A  7/2013
CN  103535396 A  1/2014
(Continued)

*Primary Examiner* — David J Walczak
*Assistant Examiner* — Joshua R Wiljanen (57) ABSTRACT

The present invention relates to a pressure oven with a pressurized inner container. The pressure oven includes an oven body, the inner container, an oven door and a handle, where the bottom side of the oven door is rotatably connected with the oven body, the handle is provided on top of the oven door, two locking catches are horizontally provided on the front face of the oven body, the corresponding inner surface of the oven door is provided with two locking hooks, and the handle drives the two locking hooks to rotate via a linkage drive device so as to achieve locking or unlocking between the locking hooks and the locking catches. The pressure oven has a rational structural design, the oven door is convenient for opening and closing, and a pressure relief valve is designed to be on the oven door so as to help combine the oven as an integral part of the entire kitchen. In addition, heating electronic elements are located at the back faces of the oven door and the oven body, such that two side faces of the oven body do not have a heating element. The heating element in the oven door is cooled by a cooling fan, the heat from the heating element at the back face of the oven body is dissipated via heat dissipation holes, such that no heat dissipation hole is needed on the two side faces of the oven body. The oven has an attractive appearance, the inner container is an integral body with a high tensile strength, has no gap, and is easy to clean. The pressure oven can be secured by a hanging hook and can be easily dismounted.

10 Claims, 9 Drawing Sheets

(58) Field of Classification Search
USPC .................................................. 219/243, 401
See application file for complete search history.

(56) References Cited

FOREIGN PATENT DOCUMENTS

| | | |
|---|---|---|
| CN | 105193294 A | 12/2015 |
| CN | 204950623 U | 1/2016 |
| CN | 205031078 U | 2/2016 |
| CN | 205053845 U | 3/2016 |
| CN | 105662173 A | 6/2016 |
| CN | 205671944 U | 11/2016 |
| CN | 205671945 U | 11/2016 |
| CN | 205671946 U | 11/2016 |
| CN | 205671947 U | 11/2016 |
| CN | 205671948 U | 11/2016 |
| CN | 205671949 U | 11/2016 |
| CN | 205671950 U | 11/2016 |

PRESSURE OVEN

TECHNICAL FIELD

The present invention relates to a pressure oven with a pressurized inner container.

BACKGROUND ART

The door locking mechanism of the existing pressure oven is typically very complicated. As a result, the probability of opening the door by mistake is very high. This is particularly true for the elderly and women, as they may have difficulties in operation; if the force is not large enough, the oven door cannot be properly opened or closed, which is not convenient.

SUMMARY OF INVENTION

In light of the foregoing, one object of the present invention is to provide a pressure oven having a simple and easy-to-operate door locking mechanism.

The object of the present invention is achieved as follows.

A pressure oven includes an oven body, an inner container, an oven door and a handle, a bottom side of the oven door is rotatably connected with the oven body, the handle is provided on top of the oven door, two locking catches are horizontally provided on a front surface of the oven body, the corresponding inner surface of the oven door is provided with two locking hooks, and the handle drives the two locking hooks to rotate via a linkage drive device so as to achieve locking or unlocking between the locking hooks and the locking catches.

The oven door is provided with a pressure relief valve, where the pressure relief valve comprises a pressure relief tube penetrating into the oven door, a hammer freely located at a pressure relief end opening of the pressure relief tube outside of the oven door, a lever covering an outer surface of the pressure relief tube for pushing up the hammer, and a drive mechanism for driving the lever to rotate, wherein an air inlet ending opening of the pressure relief tube is in communication with the inner container.

A cooling fan is provided within the oven door, and a cold air inlet opening and a hot air outlet opening are provided on the periphery of the oven door.

The inner surface of the oven door is provided with a door sealing device, wherein the door sealing device comprises a lining plate and a sealing strip on the periphery of the lining plate, the lining plate is fixedly connected with the oven door, and the sealing strip is pressed to fit an end opening of the inner container.

The foregoing technical solution can be further improved as follows.

The linkage drive device includes a first hinge, a second hinge, a transition hinge, a first transmission rod, a second transmission rod, a first linking rod and a second linking rod, the first hinge is fixed connected to the handle, two ends of the first transmission rod are respectively connected with one end on the same side of the first hinge and the second hinge, two ends of the second transmission rod are also respectively connected with the other end on the same side of the first hinge and the second hinge, a central portion of the second hinge is fixedly connected with a central portion of the transition hinge, two ends of the transition hinge are respectively connected with a central portion of the first linking rod and a central portion of the second linking rod, two ends of the first linking rod are respectively connected with the locking hooks, two ends of the second linking rod are also respectively connected with the locking hooks, and central portions of the two locking hooks are respectively mounted on the oven door via pivots.

The linkage drive device includes a hinge, a first linking rod and a second linking rod, the handle is fixedly connected with a central portion of the hinge, two ends of the hinge are respectively connected with a central portion of the first linking rod and a central portion of the second linking rod, two ends of the first linking rod are respectively connected with the locking hooks, two ends of the second linking rod are also respectively connected with the locking hooks, and central portions of the two locking hooks are respectively mounted on the oven door via pivots.

The linkage drive device includes a first linking rod and a second linking rod, two ends of the first linking rod are respectively connected with the locking hooks, two ends of the second linking rod are also respectively connected with the locking hooks, the handle is fixed connected with one locking hook, and the two locking hooks are rotatably connected with the oven door.

The drive device includes a solenoid valve, the lever comprises a first antenna, the solenoid valve acts to drive the first antenna to rotate, the first antenna drives the lever to rotate, and the lever is provided with an arm to push up the hammer.

The drive device is a rotation angle provided on one side of the linkage drive device, the lever comprises a second antenna, the rotation angle acts to drive the second antenna to rotate, and the second antenna drives the lever to rotate, the lever is provided with an arm to push up the hammer.

The heating tubes are fixedly mounted on a back surface of the inner container, a set of heating tubes are suspended above the inner container, a light is provided on a top surface of the inner container, hooks extend from two sides of the light, hooks hook the heating tubes suspended above the inner container, another set of heating tubes are suspended above a bottom surface of the inner container, and hooks provided on two sides of the inner container respectively hook the heating tubes suspended above the bottom surface of the inner container.

Two side surfaces of the inner container are respectively provided with hooks, and the hooks are fixed on a side surface of the inner container via screws.

An inner end of the handle is provided with a rotary wheel, and ratchet teeth are provided on a surface of the rotary wheel, a corresponding side of the rotary wheel is provided with a push rod, an inner end of the push rod is provided with a spring, and an outer end of the push rod abuts against the surface of the rotary wheel through an elastic force of the spring.

The inner container is integrally formed by stretching.

The pressure oven of the present invention has a rational structural design, the oven door is convenient for opening and closing, and a pressure relief valve is designed to be on the oven door so as to help combine the oven as an integral part of the entire kitchen. In addition, heating electronic elements are located at the back faces of the oven door and the oven body, such that two side faces of the oven body do not have a heating element. The heating element in the oven door is cooled by a cooling fan, and the heat from the heating element at the back face of the oven body is dissipated via heat dissipation holes, such that no heat dissipation hole is needed on the two side faces of the oven body. The oven has an attractive appearance, the inner container is an integral body with a high tensile strength, has no gap, and is easy to clean. The pressure oven can be secured by a hanging hook and can be easily dismounted. The pressure of the inner container of the pressure oven of the present invention is from 11 kPa to 15 kPa.

DESCRIPTION OF EMBODIMENTS

The present invention will be further described in detail below with reference to the accompanying drawings.

In reference to FIGS. 1 to 14, example 1 of the present invention is a pressure oven, which includes an oven body 1, an inner container 2, an oven door 3 and a handle 4, a bottom side of the oven door 3 is rotatably connected with the oven body 1, the handle 4 is provided on top of the oven door 3, two locking catches 5 are horizontally provided on a front surface of the oven body 1, the corresponding inner surface of the oven door is provided with two locking hooks 6, and the handle 4 drives the two locking hooks to rotate via a linkage drive device so as to achieve locking or unlocking between the locking hooks 6 and the locking catches 5.

Figure 1:
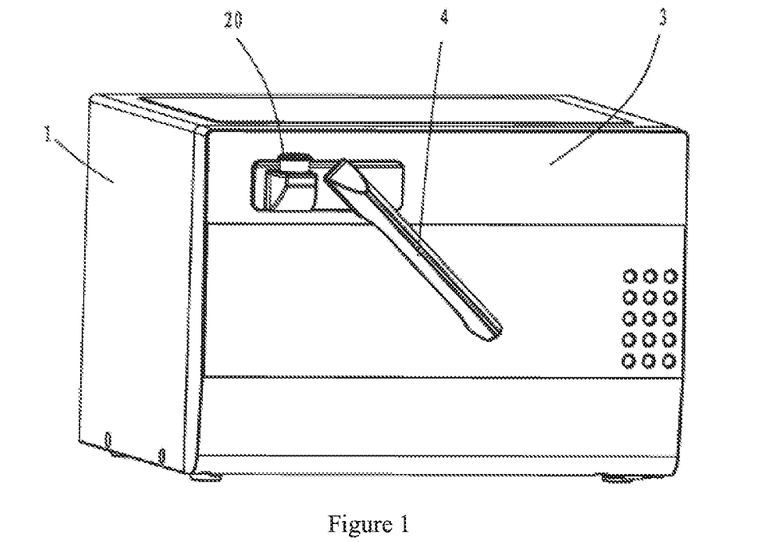
FIG. 1 is a perspective view of an embodiment.
Figure 2:
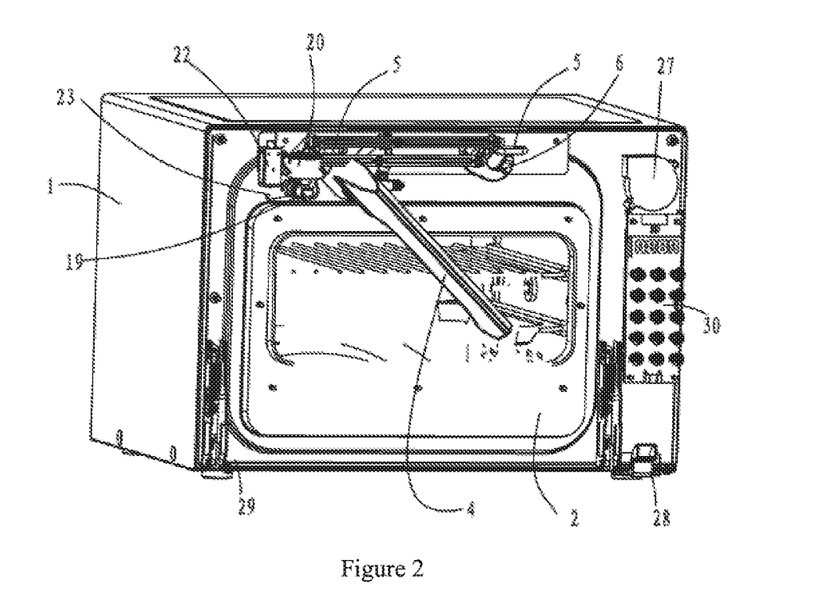
FIG. 2 is a schematic view of the structure of the linkage drive device in one embodiment, in which the locking hook is unlocked from the locking catch.
Figure 3:
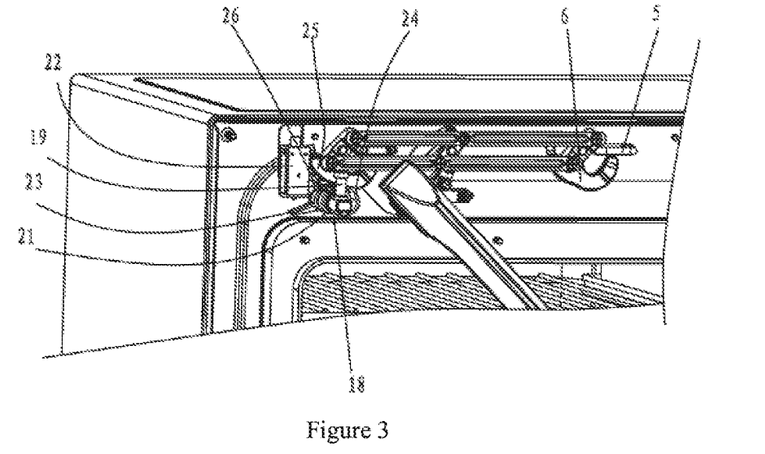
FIG. 3 is a schematic view of the structure of the linkage drive device in one or more embodiments, in which the locking hook is unlocked from the locking catch, and the hammer is omitted.
Figure 4:
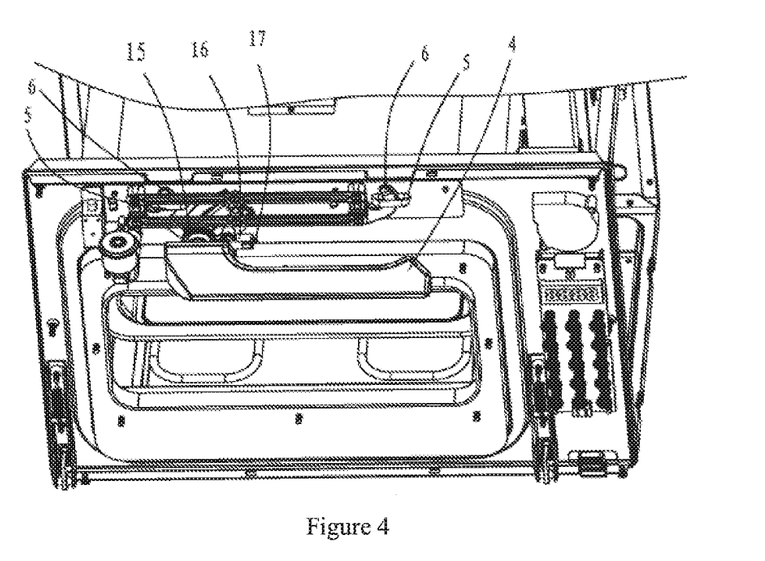
FIG. 4 is a schematic view of the structure of the linkage drive device in one or more embodiments, in which the locking hook is locked with the locking catch.
Figure 5:
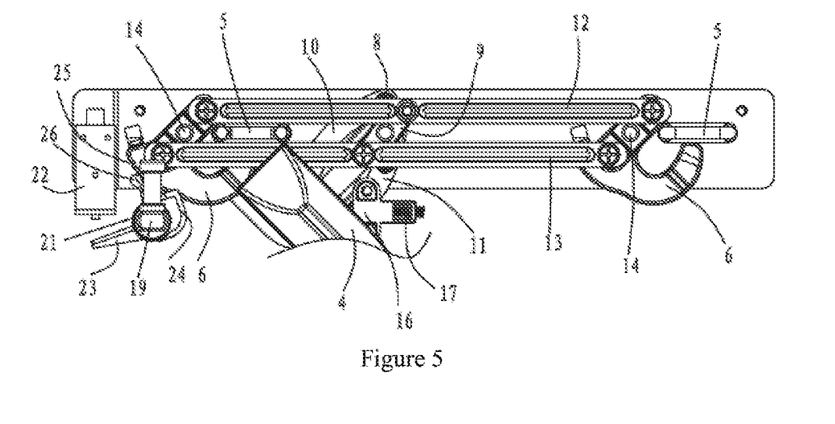
FIG. 5 is a schematic view of the structure of the linkage drive device alone shown in FIG. 2.
Figure 6:
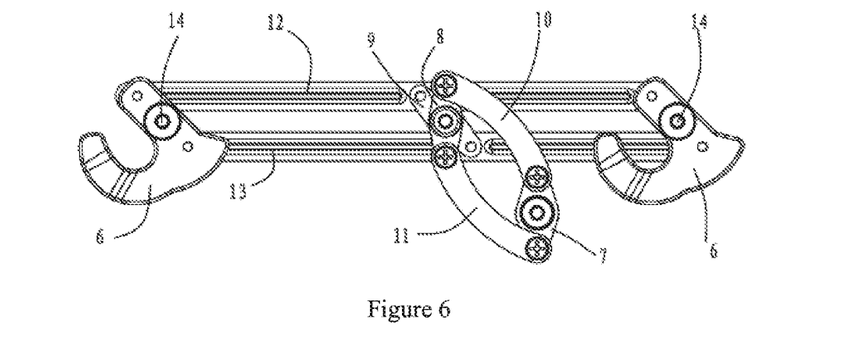
FIG. 6 is a schematic view of the structure of the back side of the linkage drive device shown in FIG. 5.
Figure 7:
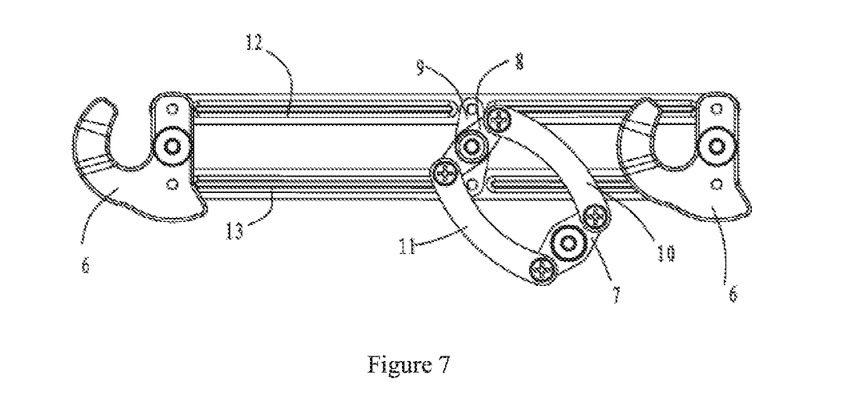
FIG. 7 is a schematic view of the structure of the linkage drive device as shown in FIG. 6, which is rotated and then locked.
Figure 8:
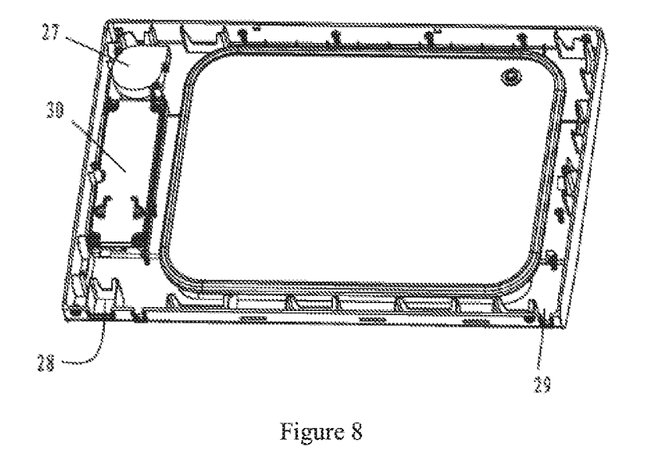
FIG. 8 is a schematic view of the structure of the inner surface of the oven door.

In reference to FIGS. 5, 6 and 7, the linkage drive device includes a first hinge 7, a second hinge 8, a transition hinge 9, a first transmission rod 10, a second transmission rod 11, a first linking rod 12 and a second linking rod 13, the first hinge 7 is fixed connected to the handle 4, two ends of the first transmission rod 10 are respectively connected with one end on the same side of the first hinge 7 and the second hinge 8, two ends of the second transmission rod 11 are also respectively connected with the other end on the same side of the first hinge 7 and the second hinge 8, a central portion of the second hinge 8 is fixedly connected with a central portion of the transition hinge 9, two ends of the transition hinge 9 are respectively connected with a central portion of the first linking rod 12 and a central portion of the second linking rod 13, two ends of the first linking rod 12 are respectively connected with the locking hooks 6, two ends of the second linking rod 13 are also respectively connected with the locking hooks 6, and central portions of the two locking hooks 6 are respectively mounted on the oven door 3 via pivots 14. When the handle is rotated, the first hinge is driven to rotate, the second hinge is driven by the first hinge via the first transmission rod and the second transmission rod, the second hinge is fixedly connected with the transition hinge, such that the transition hinge rotates synchronously, the transition hinge next drives the first linking rod and the second linking rod to swing, the first linking rod and the second linking rod drive the locking hooks to rotate, so as to achieve the locking between the locking hooks and the licking catches. On the other hand, when the handle is rotated in the opposite direction, the locking hooks will be unlocked from the licking catches. oven door.

An electronic control device 30 is arranged between the cold air inlet opening 28 and the cooling fan 27.

Figure 9:
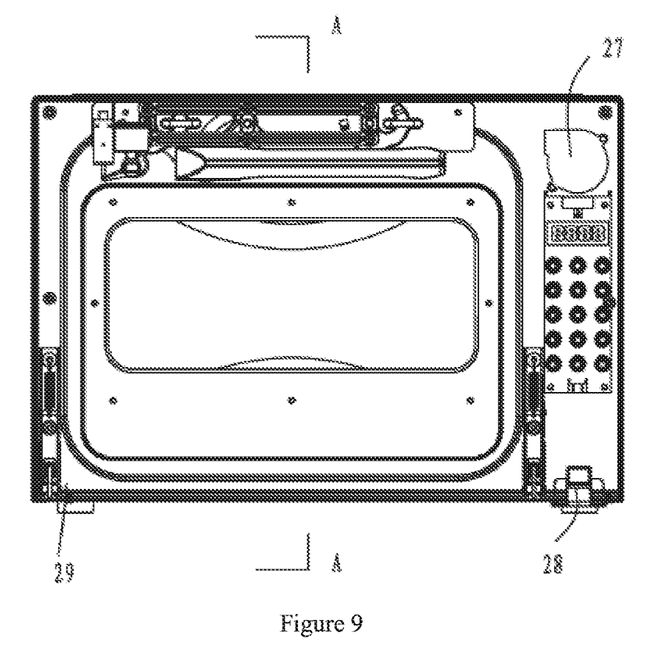
FIG. 9 is a schematic view of the structure of one embodiment when the outer surface of the oven door is removed.
Figure 10:
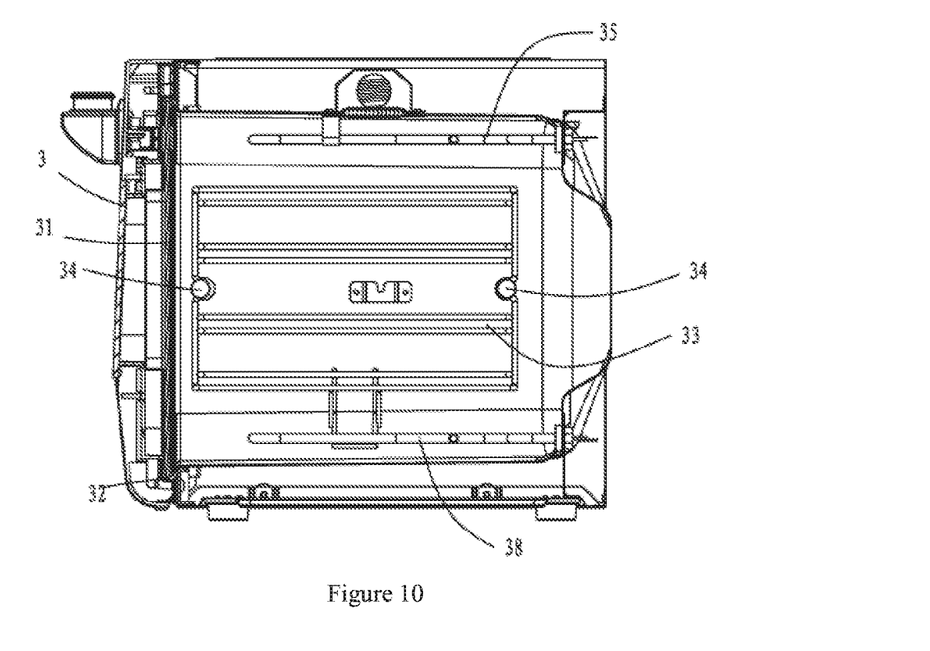
FIG. 10 is a schematic cross-sectional view taken along line A-A.
Figure 11:
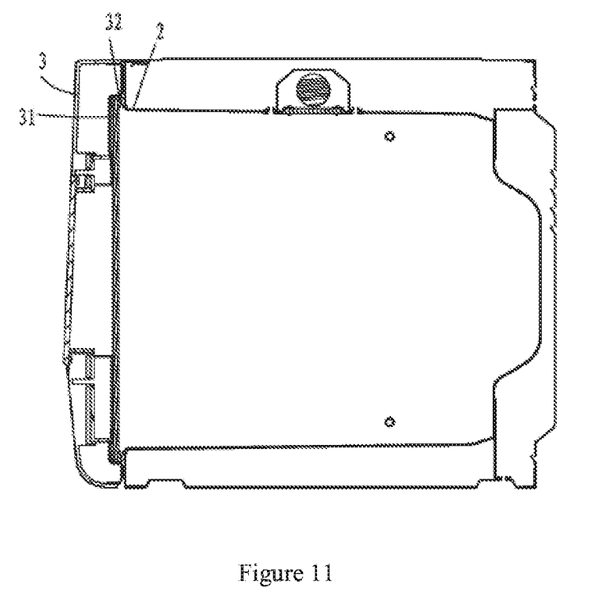
FIG. 11 is a simplified schematic view of FIG. 10, mainly showing the oven door seal structure.

In reference to FIGS. 9 to 11, the inner surface of the oven door 3 is provided with a door sealing device, the door sealing device includes a lining plate 31 and a sealing strip 32 on the periphery of the lining plate 31, the lining plate 31 is fixedly connected with the oven door, and the sealing strip 32 is pressed to fit an end opening of the inner container 2.

Figure 12:
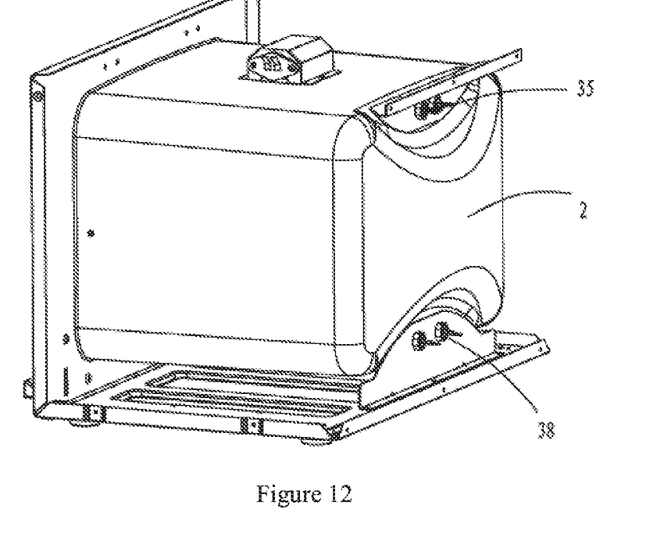
FIG. 12 is a schematic view of the structure of the back side of the inner container.

In reference to FIG. 12, the inner container 2 is integrally formed by stretching. In addition, two side surfaces of the inner container 2 are respectively provided with hooks 33, and the hooks 33 are fixed on a side surface of the inner container via screws 34.

Figure 13:
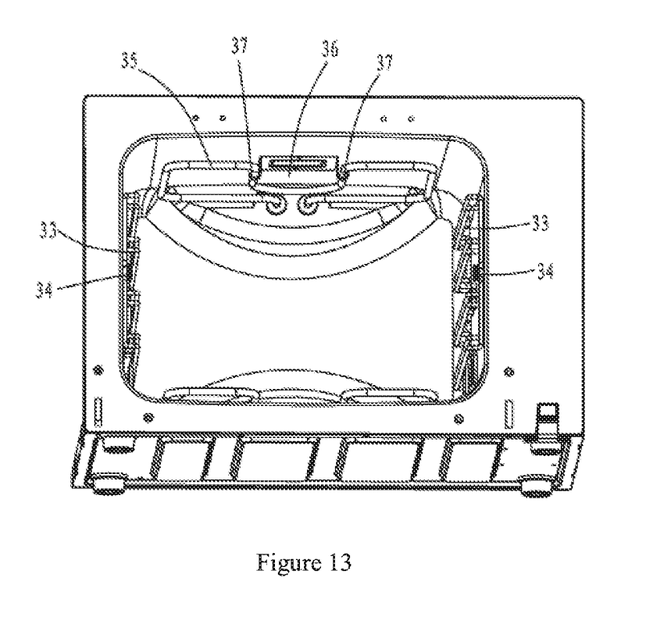
FIG. 13 is a schematic view showing the fixed heating tubes above the inner container.
Figure 14:
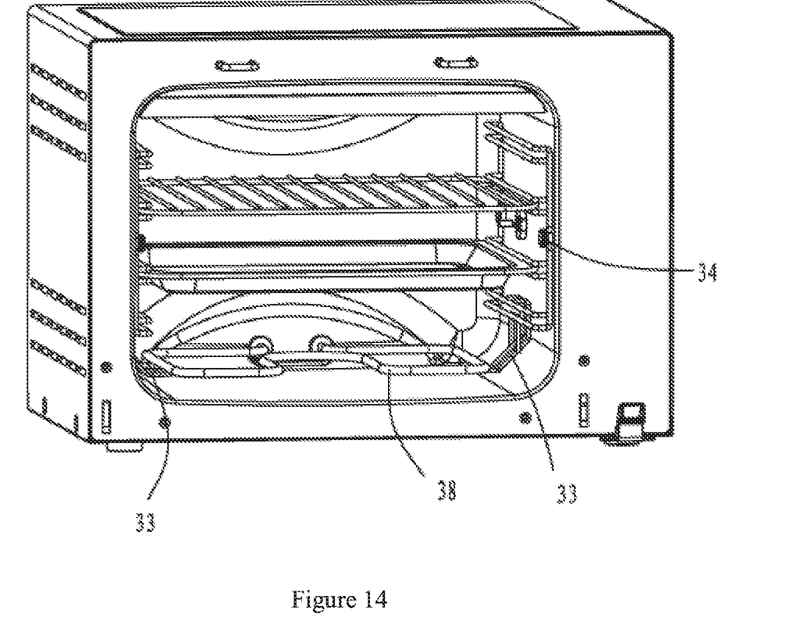
FIG. 14 is a schematic view showing the fixed heating tubes below the inner container.
Figure 15:
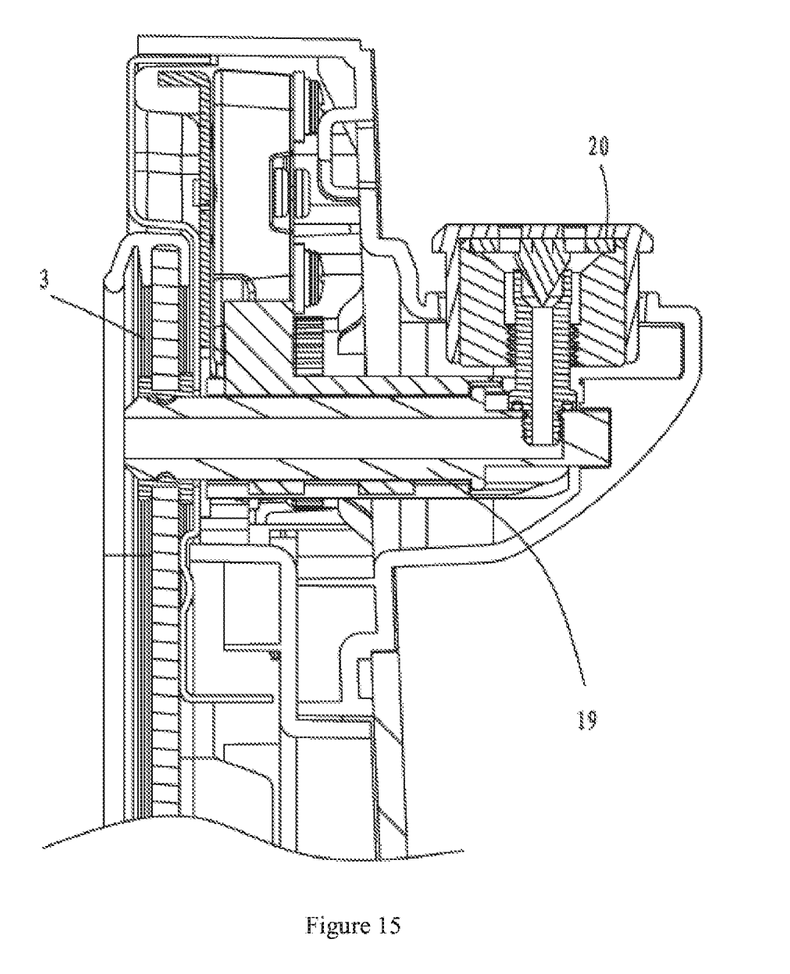
FIG. 15 is a schematic view of the structure of the pressure relief valve.

In reference to FIGS. 12 to 14, two sets of heating tubes are fixedly mounted on a back surface of the inner container 2, a set of heating tubes 35 are suspended above the inner container 2, a light 36 is provided on a top surface of the inner container 2, hooks 37 extend from two sides of the light 36, hooks 37 hook the heating tubes 35 suspended above the inner container, another set of heating tubes 38 are suspended above a bottom surface of the inner container 2, and hooks 33 provided on two sides of the inner container respectively hook the heating tubes 38 suspended above the bottom surface of the inner container.

Figure 16:
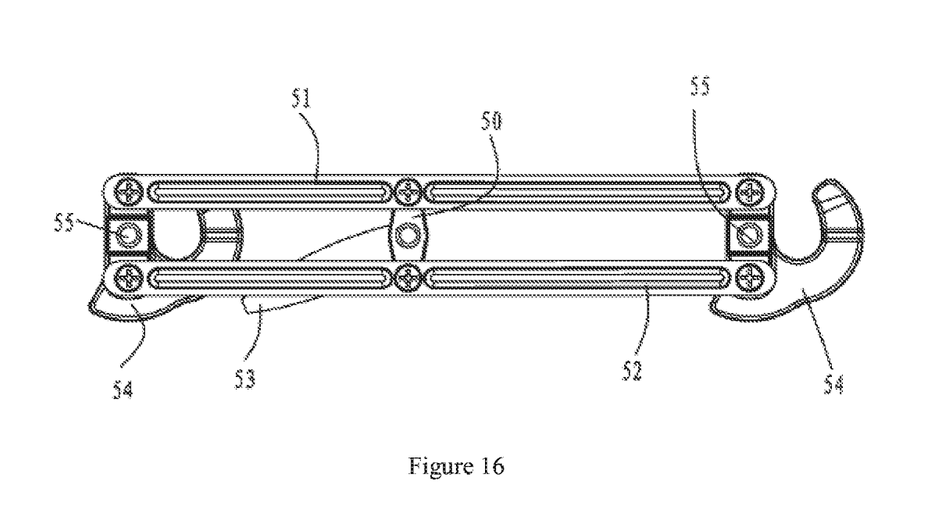
FIG. 16 is a schematic view of the structure of the linkage drive device in another embodiment, which is a schematic structural view shown in the direction from the inner container to the oven door.

In reference to FIG. 16, Example 2 is shown, in which the main difference between Example 2 and Example 1 is that the linkage drive device is simplified, and the first hinge, the second hinge, the first transmission rod and the second transmission rod are all omitted.

The linkage drive device includes a hinge 50, a first linking rod 51 and a second linking rod 52, the handle 53 is fixedly connected with a central portion of the hinge 50, two ends of the hinge 50 are respectively connected with a central portion of the first linking rod 51 and a central portion of the second linking rod 52, two ends of the first linking rod 51 are respectively connected with the locking hooks 54, two ends of the second linking rod 52 are also respectively connected with the locking hooks 54, and central portions of the two locking hooks 54 are respectively mounted on the oven door via pivots 55. In this way, when the handle is rotated, the hinge is driven to rotate, the hinge drives the first linking rod and the second linking rod to swing, and the first linking rod and the second linking rod drive the locking hooks to rotate.

Figure 17:
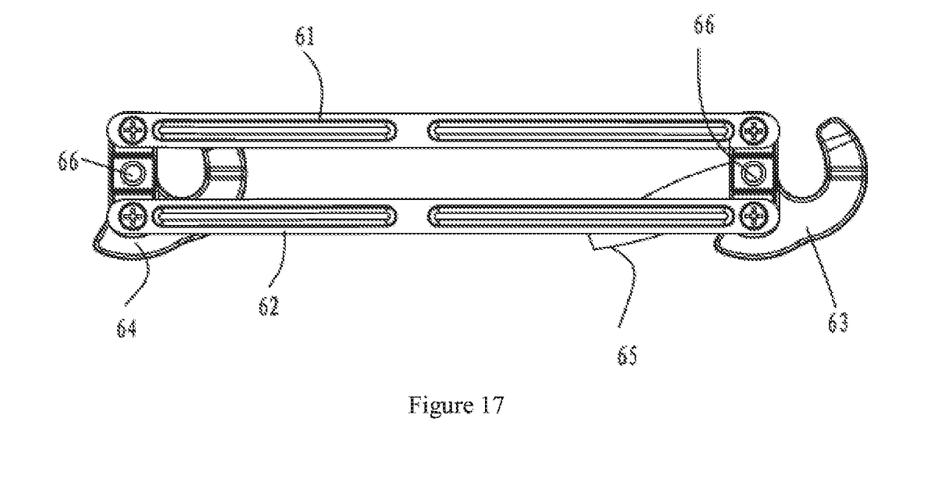
FIG. 17 is a schematic view of the structure of the linkage drive device in a third embodiment, which is a schematic structural view shown in the direction from the inner container to the oven door.

In reference to FIG. 17, Example 3 is shown, in which the main difference between Example 3 and Example 1 is that the linkage drive device is simplified, and the first hinge, the second hinge, the transition hinge, the first transmission rod and the second transmission rod are all omitted.

The linkage drive device includes a first linking rod 61 and a second linking rod 62, two ends of the first linking rod 61 are respectively connected with the locking hooks 63, 64, two ends of the second linking rod 62 are also respectively connected with the locking hooks 63, 64, the handle 65 is fixed connected with the locking hook 63, and the central portions of the locking hooks 63, 64 are respectively mounted on the oven door via pivots 66. In this way, when the handle 65 is rotated, the locking hook 63 is driven to rotate, the rotation of the locking hook 63 further drives the first linking rod 61 and the second linking rod 62 to swing, and the first linking rod and the second linking rod drive the locking hook 64 to rotate.

What is claimed is:

1. A pressure oven, comprising an oven body, an inner container, an oven door and a handle, wherein a bottom side of the oven door is rotatably coupled to the oven body, the handle is provided on top of the oven door, which is characterized in that: two locking catches are horizontally provided at an upper portion of a front surface of the oven body, a corresponding inner surface of the oven door is provided with two locking hooks, the handle drives the two locking hooks to rotate via a linkage drive device so as to achieve locking or unlocking between the locking hooks and the locking catches;
   the oven door is provided with a pressure relief valve, the pressure relief valve comprises a pressure relief tube penetrating into the oven door, a weight freely located at a pressure relief end opening of the pressure relief tube outside of the oven door, a lever covering an outer surface of the pressure relief tube for pushing up the weight, and a drive mechanism for driving the lever to rotate, wherein an air inlet ending opening of the pressure relief tube is in communication with the inner container;
   a cooling fan is provided within the oven door, a cold air inlet opening and a hot air outlet opening are provided on a periphery of the oven door;
   an inner surface of the oven door is provided with a door sealing device, wherein the door sealing device comprises a lining plate and a sealing strip on a periphery of the lining plate, the lining plate is fixedly coupled to the oven door, and the sealing strip is pressed against an end opening of the inner container.

2. The pressure oven according to claim 1, characterized in that: the linkage drive device comprises a first hinge, a second hinge, a transition hinge, a first transmission rod, a second transmission rod, a first linking rod and a second linking rod, wherein the first hinge is fixedly coupled to the handle, two ends of the first transmission rod are respectively coupled to one end on the same side of the first hinge and the second hinge, two ends of the second transmission rod are also respectively coupled to the other end on the same side of the first hinge and the second hinge, a central portion of the second hinge is fixedly coupled to a central portion of the transition hinge, two ends of the transition hinge are respectively coupled to a central portion of the first linking rod and a central portion of the second linking rod, two ends of the first linking rod are respectively coupled to the locking hooks, two ends of the second linking rod are also respectively coupled to the locking hooks, central portions of the two locking hooks are respectively mounted on the oven door via pivots.

3. The pressure oven according to claim 1, characterized in that: the linkage drive device comprises a hinge, a first linking rod and a second linking rod, wherein the handle is fixedly coupled to a central portion of the hinge, two ends of the hinge are respectively coupled to a central portion of the first linking rod and a central portion of the second linking rod, two ends of the first linking rod are respectively coupled to the locking hooks, two ends of the second linking rod are also respectively coupled to the locking hooks, central portions of the two locking hooks are respectively mounted on the oven door via pivots.

4. The pressure oven according to claim 1, characterized in that: the linkage drive device comprises a first linking rod and a second linking rod, two ends of the first linking rod are respectively coupled to the locking hooks, two ends of the second linking rod are also respectively coupled to the locking hooks, the handle is fixedly coupled to one locking hook, and the two locking hooks are rotatably coupled to the oven door.

5. The pressure oven according to claim 1, characterized in that: the drive device comprises a solenoid valve, the lever comprises a first antenna, the solenoid valve acts to drive the first antenna to rotate, the first antenna drives the lever to rotate, and the lever is provided with an arm to push up the weight.

6. The pressure oven according to claim 1, characterized in that: the drive device is a rotation corner provided on one side of the linkage drive device, the lever comprises a second antenna, the rotation corner acts to drive the second antenna to rotate, and the second antenna drives the lever to rotate, the lever is provided with an arm to push up the weight.

7. The pressure oven according to claim 1, characterized in that: heating tubes are fixedly mounted on a back surface of the inner container, a set of heating tubes are suspended above in the inner container, a light is provided on a top surface of the inner container, hooks extend from two sides of the light, hooks hook the heating tubes suspended above in the inner container, another set of heating tubes are suspended above a bottom surface of the inner container, hooks provided on two sides of the inner container to respectively hook the heating tubes suspended above the bottom surface of the inner container.

8. The pressure oven according to claim 1, characterized in that: two side surfaces of the inner container are respectively provided with hooks, and the hooks are fixed on the side surfaces of the inner container via screws.

9. The pressure oven according to claim 1, characterized in that: an inner end of the handle is provided with a rotary wheel, and ratchet teeth are provided on a surface of the rotary wheel, a corresponding side of the rotary wheel is provided with a push rod, an inner end of the push rod is provided with a spring, and an outer end of the push rod abuts firmly against the surface of the rotary wheel through an elastic force of the spring.

10. The pressure oven according to claim 1, characterized in that: the inner container is integrally formed by stretching.

* * * * *